Nov. 22, 1949 V. N. TRAMONTINI 2,488,748
THERMOSTATIC SWITCH
Filed June 14, 1947 3 Sheets-Sheet 1
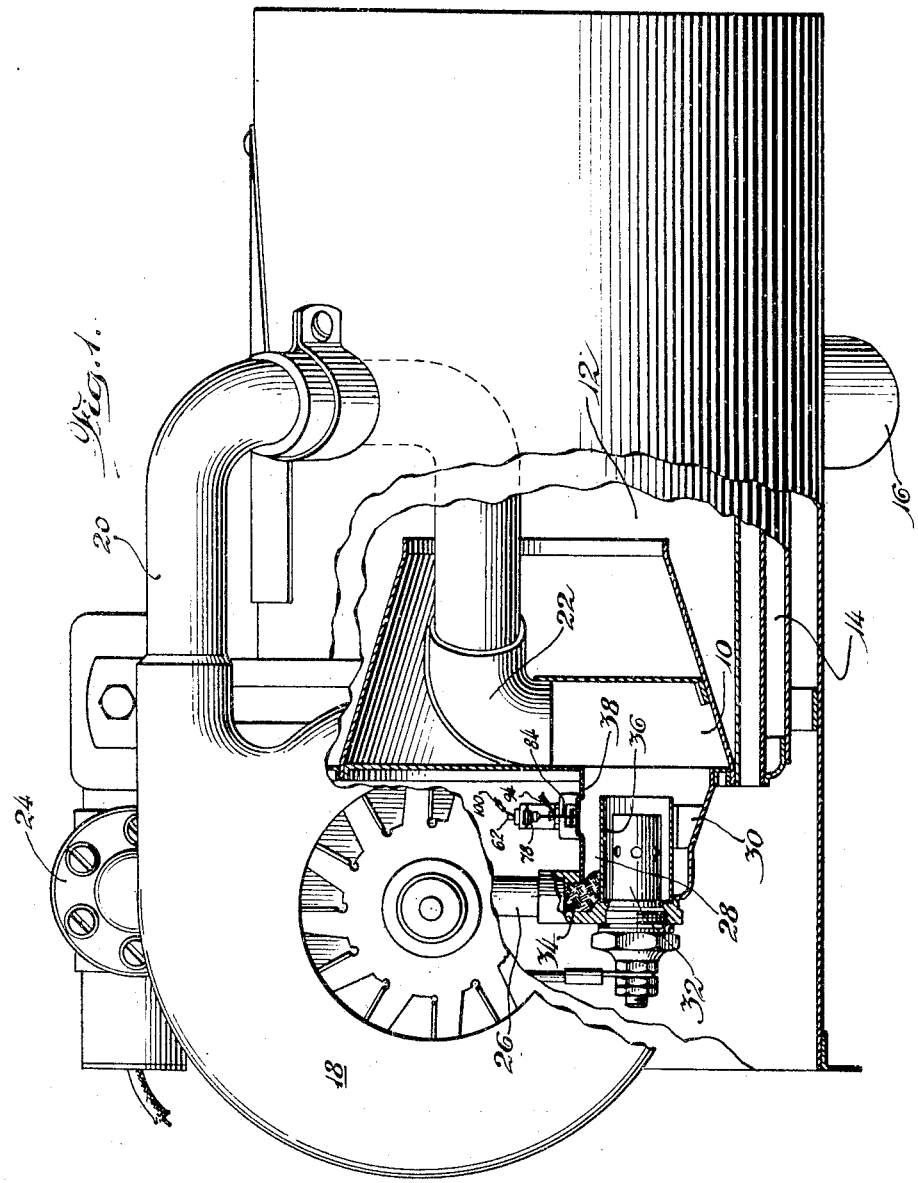
Inventor:
Vernon N. Tramontini
By Hinkle, Horton, Ahlberg, Hausmann & Napper
Attorneys.

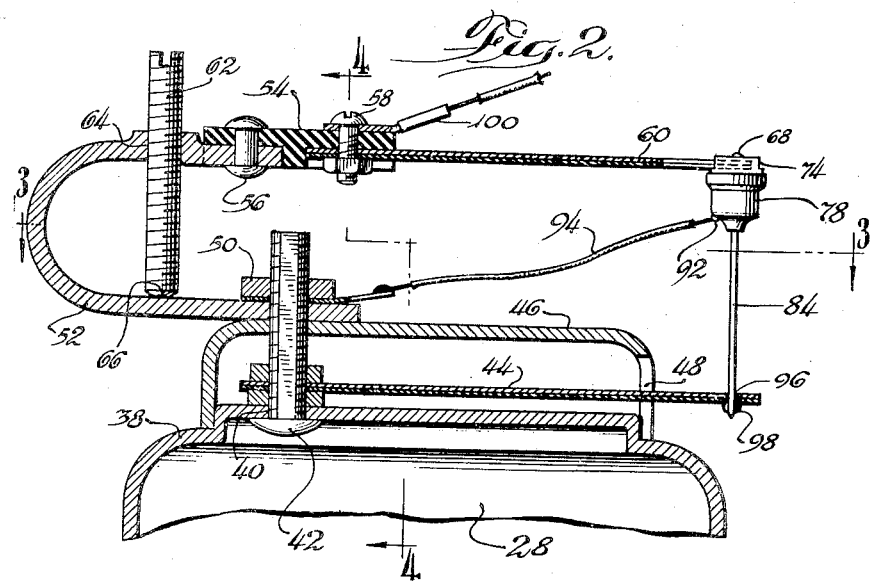
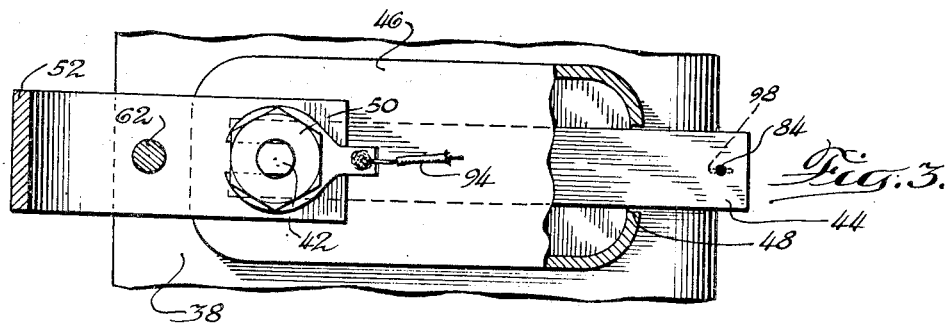
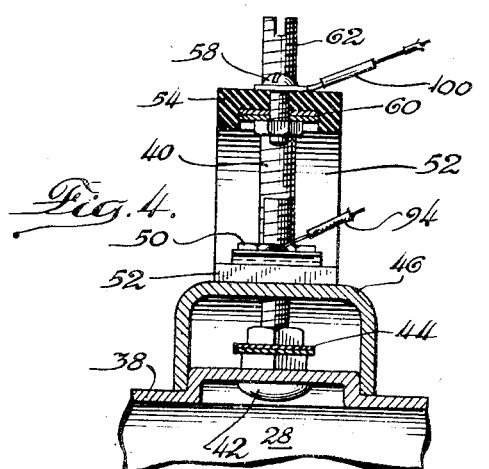
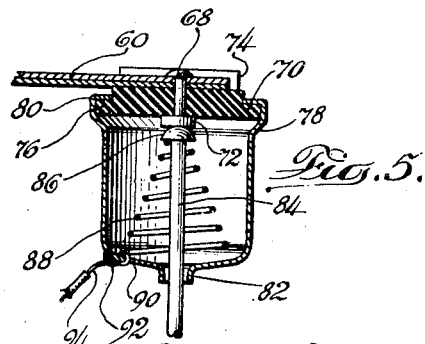

Nov. 22, 1949 V. N. TRAMONTINI 2,488,748
THERMOSTATIC SWITCH
Filed June 14, 1947 3 Sheets-Sheet 3
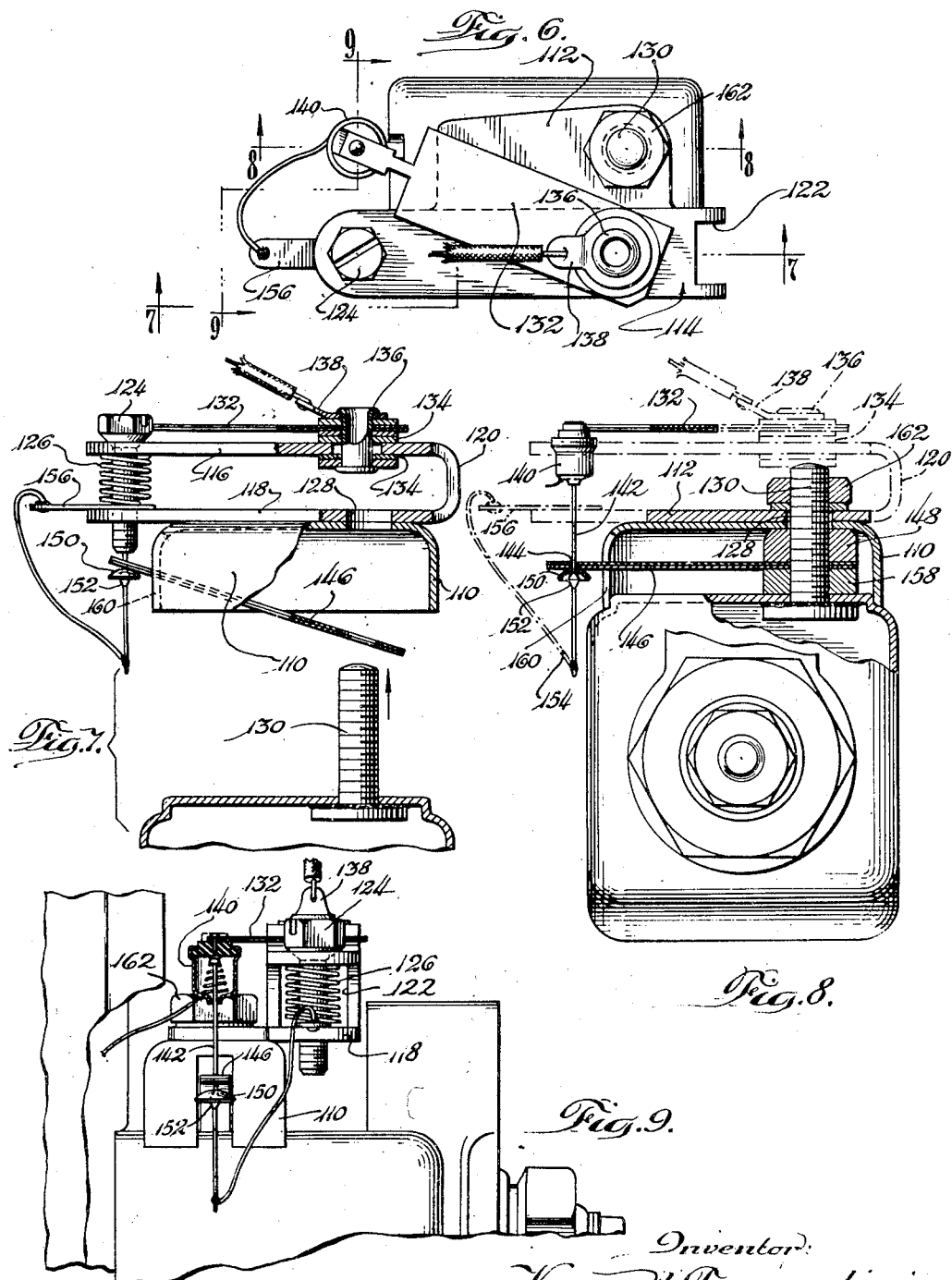
Inventor:
Vernon N. Tramontini
By Hinkle, Horton, Ahlberg, Hausmann & Bupp
Attorneys Patented Nov. 22, 1949

2,488,748

UNITED STATES PATENT OFFICE 2,488,748

THERMOSTATIC SWITCH

Vernon N. Tramontini, Indianapolis, Ind., assignor to Stewart-Warner Corporation, Chicago, Ill., a corporation of Virginia Application June 14, 1947, Serial No. 754,669

2 Claims. (Cl. 200—138)

The present invention relates to burner thermostats and more particularly to a thermostat to be actuated by a heater burner and which is used in the control system for the heater. More particularly, the thermostat forming the subject matter of the present invention is especially useful in place of the burner thermostat shown in my copending application Serial No. 691,190 filed August 17, 1946 for "Heater burner," now Patent No. 2,481,631 granted September 13, 1949, although the thermostat of the present invention of course has a more general application. The heater illustrated in the copending application just referred to is more particularly described in the application of George W. Allen and Vernon N. Tramontini, Serial No. 676,776, which was filed June 14, 1946.

One of the objects of the present invention is to provide a novel thermostat for a heater which is sensitive to the burner temperature and which is compensated for ambient temperature variations.

Still another object is to provide an improved novel burner thermostat having the above advantage which may be manufactured at extremely low cost and which is stable in operation and easily adjustable.

Still another object is to provide a novel burner thermostat which is adapted to be operated by the rise in burner temperature when combustion is present therein and which particularly is adapted for connection to a portion of the burner, the temperature of which does not rise greatly when combustion is present.

Yet another object is to provide a novel thermostatic switch which is responsive to a condition within a burner with which it is used and which is not substantially influenced in its operation by the temperature of the ambient air.

An additional object is to provide an improved thermostat to be operated by changing conditions within a heater burner but which need not be subjected to high temperatures in order to insure certainty of operation under changing ambient conditions.

Other objects and advantages will become apparent from the following description of a preferred embodiment of my invention which is illustrated in the accompanying drawings.

In the drawings:

Fig. 1 is a side view of a heater incorporating the present invention with portions thereof broken away so as better to disclose the association of the thermostat proper of the present invention with the remaining heater structure;

Fig. 2 is a side view partially in section of the thermostat of the present invention shown connected to a heater burner;

Fig. 3 is a horizontal sectional view which may be considered as taken substantially along the line 3—3 of Fig. 2 in the direction indicated by the arrows;

Fig. 4 is a transverse sectional view in a vertical plane which may be considered as taken in the direction of the arrows substantially along the line 4—4 of Fig. 1;

Fig. 5 is a longitudinal sectional view in a vertical plane through the switch portion of the mechanism;

Fig. 6 is a top view of an alternative type of switch embodying the present invention;

Fig. 7 is a longitudinal sectional view therethrough which may be considered as taken in the direction of the arrows substantially along the line 7—7 of Fig. 6;

Fig. 8 is a longitudinal sectional view which may be considered as taken in the direction of the arrows along the line 8—8 of Fig. 6; and Fig. 9 is a transverse sectional view which may be considered as taken in the direction of the arrows along the line 9—9 of Fig. 6.

The heater shown in Fig. 1 of the drawings comprises a horizontal pot-type burner 10 from which the hot products of combustion flow into the central portion of a heat exchanger 12 and thence outwardly through a passage, not shown, into an intermediate annular heat exchange space 14 and thence to an exhaust pipe 16 through which they are discharged to the atmosphere. The burner receives combustion air from a blower 18 of the centrifugal type, the air under compression passing through a tube 20. This combustion air tube extends into the heater and its outlet is equipped with an elbow 22 from which the combustion air discharges into the burner tangentially.

Liquid fuel, usually gasoline since the heater is intended primarily for heating automotive vehicles, passes through a magnetic control valve 24 which has high, low and off positions and thence downwardly through a fuel tube 26 into a box-like pocket 28, the lower surface 30 of which drains into the combustion chamber 10. An electric igniter 32 of the hot wire type extends horizontally into the pocket 28 and serves to preheat and ignite fuel flowing to the burner. In order to promote an even distribution of the fuel flowing to the burner the fuel tube 26 is stuffed at its lower end with wire gauze or the like, indicated at 34, which acts as a wick to distribute the fuel to a cylindrical shell 36 surrounding the igniter 32.

This general discussion of the heater is believed to be adequate for the present purpose. Further details of the construction and operation of this type heater are to be found in the copending applications previously referred to.

In a heater of this type it is customary to energize the igniter 32 at the time of starting and to de-energize the igniter after combustion has been well established. Preferably this is accomplished by a thermostatic switch sensitive to combustion conditions within the burner. In the present instance, this switch is mounted upon the upper surface of the pocket 28, the wall forming this upper surface being indicated by the numeral 38. This is a convenient place for mounting the switch and is also advantageous in that the switch is protected against damage and yet is accessible for adjustment. Further, since the temperature at this point is never excessive the thermostat does not have to be designed and constructed in such manner as to resist the deteriorating effect of high temperatures as is true of some flame detector thermostats.

In the previously referred to Tramontini patent application has been described one type of thermostatic switch for this purpose as well as an arrangement for using such a switch to control the heater. The switch in that application is of a type which is normally open and which is closed when the temperature conditions indicate the presence of combustion within the burner. The present switch is of the same general type. That is, it is normally open but closes upon an increase in the temperature within the burner. In the previous case, however, the switch opens at a predetermined burner temperature whereas in the present case the switch is adapted to operate when the temperature at the burner pocket is a predetermined amount above ambient. The reason for this change is that the rise in temperature of the upper surface of the igniter pocket when the heater is operating is comparatively moderate with the result that the temperature to which the thermostat operating element is responsive may not be a true indication of the conditions within the burner under widely varying ambient temperature conditions.

As an example, heater operation may be desirable even though the ambient temperature is above 50 degrees F. and on the other hand, the heater may be required to operate at subzero temperatures. Thus, it is difficult to adjust the setting of an uncompensated switch to be low enough to respond to the combustion conditions when subzero temperatures prevail and at the same time not to open too quickly when the temperature is up above 50 degrees F. It has been found that this objection can be overcome if the switch is properly compensated for ambient temperature conditions so that it opens or closes upon a certain rise in the temperature of the burner pocket above ambient. The present switch is of this type and is constructed as follows.

The top 38 of the pocket 28 has an opening 40 punched therethrough to take a stud 42 which is located with its head inside the pocket. This stud is resistance welded in place and supports one end of a bimetal blade 44. This bimetal blade extends to one side and is covered with a cap 46 which prevents dust from accumulating and prevents cold air being blown over the major portion of the blade. In other words, the cap 46 provides a substantially dead air space around the portion of the blade which responds to an increase in temperature within the pocket 28. It will be appreciated, however, that the major portion of the temperature change which influences the blade 44 is conveyed to the blade by conduction through the stud 42. In order to permit the blade 44 sufficient movement upwardly and downwardly at its free end the cover 46 has a slot 48 somewhat wider than the blade 44 through which the blade extends to the outside. This slot has sufficient depth so as not to inhibit movement of the free end of the blade upwardly and downwardly between the maximum hot and cold positions. The blade 44 it so oriented that an increase in temperature thereof will cause the free end of the blade to deflect upwardly.

Above the cover 46 the stud 42 is secured by a nut 50 to a U-shaped metal bracket 52, the opposite end of which is disposed substantially above the upper end of the stud 42 and is there connected to an insulating block 54 by a rivet 56. This block in turn is secured by a nut and bolt 58 to a second bimetal strip 60 which is disposed in parallel relation to the strip 44 with its free end substantially directly above the free end of the strip 44.

Adjustment of the position of the upper bimetal blade 60 relative to the lower blade 44 is provided by a screw 62 which is threaded vertically through a tapped opening 64 in the upper portion of the U-shaped bracket 52 just beyond the block 54. The lower end of this stud abuts against the upper surface of the lower portion of the U-shaped bracket as indicated at 66. When the screw 62 is turned so as to move downwardly the lower end presses against the lower portion of the bracket 52 and forces the upper portion of the bracket upwardly, thereby increasing the spacing between the free ends of the thermostatic blades. Reverse rotation of course decreases this spacing because of the springiness of the bracket.

Near its free end the bimetal strip 60 is drilled or punched and is secured by a rivet 68 to a disc-shaped cap 70 of insulating material. This rivet is either formed of silver or of some other good contact material or, if desired, it may be of a base metal which is silver plated. At any rate, the arrangement is such that the lower head 72 of the rivet is below the lower surface of the cap 70 and forms an electrical switch contact, as will appear presently. To prevent rotation of the cap 70 relative to the free end of the thermostatic blade 60 the cap may be molded as shown so as to have parallel ribs 74 disposed one on either side of the strip 60. These two ribs, therefore, provide a slot to take the end of the bimetal strip, thereby preventing relative movement of the cap 70 and strip 60. The lower portion of the cap 70, that is, the portion below the strip 60, has an annular flange 76 over which the upper edge of a cup-like capsule 78 is rolled to secure the capsule to the cover 70. The thickness of the rib 76 is such as to provide adequate support and stiffness in the union between the capsule and the cover while at the same time providing sufficient spacing between the rolled-in edge 80 of the capsule and the lower surface of the bimetal strip 60 so as to prevent an electrical connection between these two metallic elements, thereby obviating the necessity for providing an insulating washer over the upper surface of the cap 70 although such a washer may, of course, be used, if desired.

The cup-shaped capsule 78 is provided with an extruded opening 82 at its lower end through which a wire 84 is extended, the upper end of this wire being secured to a contact element 86. The lower surface of this contact element provides a shoulder which bears against the upper end of a soft-action tapered coil spring 88, the lower end of which bears against the lower end of the capsule 78. The spring 88 therefore urges the contact element 86 upwardly against the contact element 72 and the contacts may be separated by pulling downwardly on the wire 84. In order to insure good electrical contact between the shell 78 and the contact 86 the lower end of the spring 88 is bent over so as to extend through a small opening 90 in the lower portion of the capsule 78. The portion of this spring which projects outwardly through the hole 90 is connected by solder 92 to a flexible electric lead 94 which is grounded to the stud 42. Thus, one soldering operation secures the spring 90 in place, connects the spring to the shell 78, and connects these elements to the lead 94.

The lower end of the wire 84 extends through an opening 96 in the lower bimetal blade 44, the opening 96 being directly below the capsule 78. Below the bimetal strip 44 the wire 84 is cut off and is flattened as at 98 so as to provide a pair of wings which prevent the wire 94 from being pulled upwardly relative to the free end of the bimetal blade 44 once these wings are against the lower surface of the blade.

The upper blade 60 is so oriented that when heated it moves upwardly like the blade 44. Inasmuch as it is well away from the igniter pocket 28 the blade 60 is influenced principally by the temperature of the ambient air entering the heater whereas the blade 44 is influenced by the temperature of the heater pocket.

When the heater is at rest the device is so adjusted that the contacts 72 and 86 are separated. Now, if under these conditions the temperature of the ambient air rises the bimetal blade 60 will be heated and its free end will rise while at the same time the blade 44 will similarly increase in temperature and its free end will move upwardly at approximately the same rate. The spacing between the contacts 72 and 86, therefore, remains substantially constant with changes in ambient temperature. If, now, the heater is started the temperature of the lower blade 44 will rapidly increase whereas the temperature of the blade 60 will remain approximately constant. The free end of the lower blade 44, therefore, moves upwardly relative to the capsule 78 so that in a short while the contact 86 will be urged against the contact 72 by the spring 88. When these contacts come together the switch indicates that combustion has been established and a circuit connected by way of a terminal 100 secured to the screw 58 will, therefore, be grounded by way of the bimetal blade 60, the upper contact 72, the lower contact 86, the spring 88 and the lead 94. A further increase in the temperature within the igniter pocket and, therefore, the temperature of the blade 44, will cause its free end to continue to move upwardly away from the lower flattened end 98 of the wire 84. The contacts 86 and 72 therefore remain together and neither of the blades 44 or 60 is placed under any strain since the lower blade is unrestrained in its upward movement. Whenever the heater is shut off the lower blade 44 cools and therefore moves downwardly relative to the upper blade 60 till the free end of the blade 44 comes against the shoulder provided by the wings 98 so that slight additional downward movement separates the contact 86 from the contact 72, thereby reconditioning the heater for a further start.

In a switch of this type the moving parts should be kept as light as possible so that they will be substantially unaffected by vibration. This is accomplished in the present switch by making the capsule 78 approximately one quarter of an inch long of light weight metal and by using a comparatively fine wire for the stem 84. This is feasible since the contacts are operated entirely by tension upon the wire 84. This stem or wire, therefore, does not need to be rigid enough to resist compressive loads. The weight of these elements, therefore, is almost negligible and it has been found that a switch constructed in this manner is not seriously affected by vibration normally encountered in an automotive vehicle. The purpose of the capsule shell 78 is to serve as a base or support for the lower end of the spring 88 and also to prevent dust from collecting upon the contacts 86 and 72. For all practical purposes, therefore, these contacts may be considered as sealed.

The embodiment of the invention illustrated in Figs. 6 to 9, inclusive, is essentially similar to the device just described. It differs thereover principally in the arrangement of the particular elements and in general has the advantage that the bimetal element which is responsive to ambient temperature conditions is a little farther from the heater burner and therefore less likely to be influenced by conditions within the burner. Also, adjustment of the device is somewhat finer than with the previously described embodiment.

It includes a cap 110 essentially similar to the cap 46, the upper surface of which is fastened to a flange 112 formed to one side of a U-shaped metal bracket 114. The bracket 114 has upper and lower arms 116 and 118, respectively, which are generally parallel and are connected at one end by a U-bend 120 which may be slotted as shown at 122 to weaken the strip at this point. The advantage of this is that as the angularity between the upper and lower members 116 and 118 is changed by an adjusting screw 124 the bending takes place at the weakened portion 120 without causing bowing of the strip 116. The adjusting screw 124 is passed through an opening near the free end of the upper strip 116 and has its lower end threaded through an opening in the lower strip 118. A coil spring 126 surrounds the screw 124 and is located between the strips 116 and 118 and tends to urge the free end of the strip 116 upwardly when the screw 124 is loosened. Reverse rotation of the screw tends to deflect the free end of the strip 116 downwardly.

The flange 114 formed at the side of the lower strip 118 and integral therewith has an opening 128 in alignment with the similar opening in the cover 110 and these openings are adapted to fit over a stud 130 similar to the stud 42 previously referred to in the description of the other embodiment.

A bimetallic strip 132 is secured by means of insulating washers 134 and a hollow rivet 136 to the strip 116 at a point adjacent the curved cutaway portion 120. An electric terminal 138 is also secured to the rivet 136 so that there is an electrical connection between this terminal and the strip 132 whereas these elements and the rivet are insulated from the strip 116 by the insulating washers 134.

Although the point of attachment of the bimetal strip 132 is well outward of the stud 130 the bimetallic strip is inclined toward the burner so that its free end is in substantial longitudinal alignment with the stud 130 and this free end of the bimetal strip 132 is of reduced section and is secured to the top of a capsule 140 which may be considered as substantially identical to the capsule 78 previously described. The stem 142 which extends downwardly through the lower end of the capsule passes through an opening 144 near the free end of a second bimetal strip 146, the opposite end of which is secured to the stud 130 by a nut 148. Just below the free end of the strip 146 the stem 142 carries a washer 150 having a convex upper surface. This washer is secured in place by pinching the stem at a point therebelow to form an enlargement or pair of wings 152. At a point somewhat below the enlargement 152 the stem 142 is soldered to a flexible lead 154, the opposite end of which is secured to a terminal lug 156 grounded to the frame by being located between the upper surface of the strip 118 and the lower surface of the spring 126.

The device is assembled by first dropping a washer 158 over the stud 130 and then slipping the opening in the end of the bimetallic element 146 over the stud. The nut 148 is then placed upon the stud 130 and tightened after which the cover 110 is located with the end of the bimetallic element 146 extending through a vertical slot 160 in the end of the cover. Thereafter the opening 128 in the bracket 112 is placed over the stud 130 and a second nut 162 is tightened to secure the elements in assembled relation. Adjustment of the contacts is obtained by rotating the screw 124 so as to bend the upper strip 116 upwardly or downwardly to bring the convex washer a proper distance below the free end of the bimetal strip 146. As in the case of the previous embodiment of the invention the contacts within the capsule 140 are brought together whenever there is movement of the lower strip 146 in an upward direction that exceeds the amount of upward movement of the strip 132 plus the amount of original separation of the contacts. Thereafter continued upward movement of the strip 146 is not inhibited since it merely rises with respect to the collar 150. In order to facilitate assembly, the opening 144 is somewhat larger than the stem 142 so that, as shown in Fig. 7, the opposite end of the bimetal strip inclines downwardly considerably before the elements are assembled upon the stud 130. Because of the fact that the adjustment screw in this embodiment of the invention is located at the free end of the strip 116 and the bimetal strip 132 is fixed near the pivot point of the strip, that is, the weakened section at 120, adjustment of the device is somewhat finer than is obtainable with the first embodiment of the invention.

Having described my invention, what I claim as new and useful and desire to secure by Letters Patent of the United States is:

1. A burner thermostat comprising a bimetallic element adapted to be arranged in heat exchange relation to a portion of a burner so that the temperature of said bimetallic element rises with the presence of combustion within said burner, a second bimetallic element arranged generally parallel to the first bimetallic element and spaced therefrom, said second bimetallic element being arranged to be sensitive substantially to ambient temperature conditions, each of said bimetallic elements being fixed at one end and having their opposite ends free with the free end of one bimetallic element disposed opposite the free end of the other bimetallic element, a contact secured to said second bimetallic element, a second contact arranged adjacent the first contact, a stem connected to said second contact and to said first bimetallic element, the connection between said stem and said first bimetallic element including a lost motion arangement to permit said contacts to be brought together when the free ends of said bimetallic elements approach each other a predetermined amount and thereafter to permit free movement between said stem and said first bimetallic element upon further movement in the same direction, a capsule enclosing said contacts and supported by the second bimetallic element, and resilient means in said capsule tending to urge said contacts together.

2. A burner thermostat comprising a bimetallic element adapted to be arranged in heat exchange relation to a portion of the burner so that the temperature of said bimetallic element rises with the presence of combustion within said burner, a second bimetallic element arranged generally parallel to the first bimetallic element and spaced therefrom, said second bimetallic element being arranged to be sensitive substantially to ambient temperature conditions, each of said bimetallic elements being fixed at one end and having their opposite ends free with the free end of one bimetallic element disposed opposite the free end of the other bimetallic element, a contact secured to one of said bimetallic elements, a second contact arranged adjacent the first contact, a stem connected to said second contact and to the other bimetallic element, the connection between said stem and said other bimetallic element including a lost motion arrangement to permit said contacts to be brought together when the free ends of said bimetallic elements approach each other a predetermined amount and thereafter to permit free movement between said stem and said other bimetallic element upon further movement in the same direction, a capsule enclosing said contacts and supported by one of said bimetallic elements, and resilient means in said capsule tending to urge said contacts together.

VERNON N. TRAMONTINI.

REFERENCES CITED

The following references are of record in the file of this patent:

UNITED STATES PATENTS

| Number | Name | Date |
| --- | --- | --- |
| 1,141,605 | Boekel et al. | June 1, 1915 |
| 2,181,586 | Perryman et al. | Nov. 28, 1939 |

FOREIGN PATENTS

| Number | Country | Date |
| --- | --- | --- |
| 638,489 | France | Feb. 21, 1928 |